US009594939B2

(12) United States Patent
Zumsteg

(10) Patent No.: US 9,594,939 B2
(45) Date of Patent: Mar. 14, 2017

(54) INITIAL POINT ESTABLISHMENT USING AN IMAGE OF A PORTION OF AN OBJECT

(71) Applicant: HAND HELD PRODUCTS, INC., Fort Mill, SC (US)

(72) Inventor: Philip Zumsteg, Shorewood, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 303 days.

(21) Appl. No.: 14/021,637

(22) Filed: Sep. 9, 2013

(65) Prior Publication Data

US 2015/0069122 A1 Mar. 12, 2015

(51) Int. Cl.
G06K 7/14 (2006.01)
G01B 11/02 (2006.01)
G06Q 10/00 (2012.01)
G06K 7/10 (2006.01)
H04N 1/00 (2006.01)

(52) U.S. Cl.
CPC .......... G06K 7/1443 (2013.01); G01B 11/02 (2013.01); G06K 7/10762 (2013.01); G06K 7/10861 (2013.01); G06K 7/1452 (2013.01); G06Q 10/00 (2013.01); H04N 1/00 (2013.01)

(58) Field of Classification Search
CPC .. G06K 7/1439; G06K 7/1443; G06K 7/1447; G06K 7/1452; G06K 7/1456; G01B 11/02; G01B 11/022; G01B 11/024; G01B 11/026; G01B 11/028
See application file for complete search history.

(56) References Cited

U.S. PATENT DOCUMENTS

| 6,659,344 B2 | 12/2003 | Otto et al. |
| 7,003,138 B2 | 2/2006 | Wilson |
| 7,015,967 B1 | 3/2006 | Kochi et al. |
| 7,237,721 B2 | 7/2007 | Bilcu et al. |
| 7,308,158 B2 | 12/2007 | Herbert et al. |
| 7,405,662 B2 | 7/2008 | Steinke et al. |
| 7,407,096 B2 | 8/2008 | McQueen et al. |
| 7,494,063 B2 | 2/2009 | Kotlarsky et al. |

(Continued)

FOREIGN PATENT DOCUMENTS

JP 2012171759 A * 9/2012

OTHER PUBLICATIONS

English equivalent translation of JP 2012171759 (Sep. 10, 2012), <http://translationportal.epo.org/emtp/translate/?Action=description-retrieval&Country=Jp&Engine=google&Format=docdb&Kind=A&Locale=en_Ep&Number=2012171759&Ops=jp.espacenet.com/ops&Srclang=ja&Trglang=en>, retrieved Jul. 29, 2015.*

(Continued)

*Primary Examiner* — Michael G Lee
*Assistant Examiner* — Suezu Ellis
(74) *Attorney, Agent, or Firm* — Oliff PLC; R. Brian Drozd

(57) ABSTRACT

A system and method of determining an initial point for a scan path may include acquiring, using a mobile device, an image of an object, the image comprising decodable indicia. Using the mobile device, data is decoded from the decodable indicia. Indicia dimensions of the decodable indicia are determined based on the data, and image dimensions of the decodable indicia in the image are determined. An initial location of the mobile device is calculated relative to the decodable indicia based on a geometric relationship between the indicia dimensions of the decodable indicia and the image dimensions of the decodable indicia in the image.

20 Claims, 12 Drawing Sheets

(56) References Cited

U.S. PATENT DOCUMENTS

| | | |
|---|---|---|
| 7,501,950 B2 | 3/2009 | Suzuki |
| 7,513,425 B2 | 4/2009 | Chung |
| 7,535,361 B2 | 5/2009 | Doan et al. |
| 7,551,090 B2 | 6/2009 | Doan et al. |
| 7,602,288 B2 | 10/2009 | Broussard |
| 7,627,191 B2 | 12/2009 | Xu et al. |
| 7,652,576 B1 | 1/2010 | Crossno et al. |
| 7,677,602 B2 | 3/2010 | Bennett et al. |
| 7,696,874 B2 | 4/2010 | Stevens |
| 7,702,187 B2 | 4/2010 | Rusman et al. |
| 7,708,205 B2 | 5/2010 | Kotlarsky et al. |
| 7,735,731 B2 | 6/2010 | Skaaksrud et al. |
| 7,756,292 B2 | 7/2010 | Lev |
| 7,756,319 B2 | 7/2010 | Odell |
| 7,786,865 B2 | 8/2010 | Park |
| 7,786,925 B1 | 8/2010 | Knibbe et al. |
| 7,804,407 B2 | 9/2010 | Copeland |
| 7,804,410 B2 | 9/2010 | Copeland |
| 7,804,411 B2 | 9/2010 | Copeland |
| 7,812,729 B2 | 10/2010 | Copeland |
| 7,815,121 B2 | 10/2010 | Kotlarsky et al. |
| 7,821,400 B2 | 10/2010 | Tabet et al. |
| 7,831,082 B2 | 11/2010 | Holsing et al. |
| 7,855,643 B2 | 12/2010 | Tuttle |
| 7,870,999 B2 | 1/2011 | Skaaksrud et al. |
| 7,883,013 B2 | 2/2011 | Skaaksrud et al. |
| 7,886,972 B2 | 2/2011 | Skaaksrud et al. |
| 7,951,003 B2 | 5/2011 | Russell et al. |
| 7,961,908 B2 | 6/2011 | Tzur et al. |
| 7,965,186 B2 | 6/2011 | Downie et al. |
| 7,973,661 B2 | 7/2011 | Copeland |
| 7,986,241 B2 | 7/2011 | Copeland et al. |
| 8,035,722 B2 * | 10/2011 | Nung ............................ 348/335 |
| 8,056,817 B2 | 11/2011 | Flood |
| 8,094,026 B1 | 1/2012 | Green |
| 8,104,680 B2 | 1/2012 | Kundu et al. |
| 8,115,601 B2 | 2/2012 | Nonaka |
| 8,149,090 B2 | 4/2012 | Hall et al. |
| 8,149,094 B2 | 4/2012 | Deoalikar et al. |
| 8,164,443 B2 | 4/2012 | Alston et al. |
| 8,179,261 B2 | 5/2012 | Frabasile |
| 8,290,609 B2 | 10/2012 | Ikeda et al. |
| 8,310,366 B2 | 11/2012 | Stern |
| 2002/0165758 A1 | 11/2002 | Hind et al. |
| 2004/0041029 A1 | 3/2004 | Postman et al. |
| 2005/0212817 A1 | 9/2005 | Cannon et al. |
| 2006/0093237 A1 * | 5/2006 | Jacobsen et al. ............ 382/275 |
| 2006/0262961 A1 | 11/2006 | Holsing et al. |
| 2006/0266836 A1 | 11/2006 | Bilcu et al. |
| 2007/0008136 A1 | 1/2007 | Suzuki |
| 2007/0102506 A1 | 5/2007 | Stevens |
| 2007/0199995 A1 | 8/2007 | Kotlarsky et al. |
| 2007/0215706 A1 | 9/2007 | Kotlarsky et al. |
| 2008/0037899 A1 | 2/2008 | Xu et al. |
| 2008/0061937 A1 | 3/2008 | Park |
| 2008/0111661 A1 | 5/2008 | Lin et al. |
| 2008/0164313 A1 | 7/2008 | Kotlarsky et al. |
| 2008/0164317 A1 | 7/2008 | Kotlarsky et al. |
| 2008/0169343 A1 | 7/2008 | Skaaksrud et al. |
| 2008/0172303 A1 | 7/2008 | Skaaksrud et al. |
| 2008/0173706 A1 | 7/2008 | Skaaksrud et al. |
| 2008/0173710 A1 | 7/2008 | Skaaksrud et al. |
| 2008/0203147 A1 | 8/2008 | Skaaksrud et al. |
| 2008/0203166 A1 | 8/2008 | Skaaksrud et al. |
| 2008/0210749 A1 | 9/2008 | Skaaksrud et al. |
| 2008/0210750 A1 | 9/2008 | Skaaksrud et al. |
| 2008/0224870 A1 | 9/2008 | Yeo et al. |
| 2008/0285091 A1 | 11/2008 | Skaaksrud et al. |
| 2009/0021353 A1 | 1/2009 | Nonaka |
| 2009/0039167 A1 * | 2/2009 | Wang .................. G01B 11/25 235/462.42 |
| 2009/0040025 A1 | 2/2009 | Volpi et al. |
| 2009/0045913 A1 | 2/2009 | Nelson et al. |
| 2009/0045924 A1 | 2/2009 | Roberts, Sr. et al. |
| 2009/0121025 A1 | 5/2009 | Romanchik |
| 2009/0161964 A1 | 6/2009 | Tzur et al. |
| 2009/0243801 A1 | 10/2009 | Strzelczyk |
| 2009/0245755 A1 | 10/2009 | Lee et al. |
| 2009/0322537 A1 | 12/2009 | Tapp et al. |
| 2010/0039284 A1 | 2/2010 | Hall et al. |
| 2010/0045436 A1 | 2/2010 | Rinkes |
| 2010/0059589 A1 | 3/2010 | Goncalves et al. |
| 2010/0060455 A1 | 3/2010 | Frabasile |
| 2010/0073487 A1 | 3/2010 | Sogoh et al. |
| 2010/0109844 A1 | 5/2010 | Carrick et al. |
| 2010/0109903 A1 | 5/2010 | Carrick |
| 2010/0142825 A1 | 6/2010 | Maxwell et al. |
| 2010/0148985 A1 | 6/2010 | Lin et al. |
| 2010/0157051 A1 | 6/2010 | Pankanti |
| 2010/0201488 A1 | 8/2010 | Stern et al. |
| 2010/0201520 A1 | 8/2010 | Stern et al. |
| 2010/0220894 A1 | 9/2010 | Ackley et al. |
| 2010/0226530 A1 | 9/2010 | Lev |
| 2010/0232712 A1 | 9/2010 | Tomita et al. |
| 2010/0252621 A1 | 10/2010 | Ito et al. |
| 2010/0259385 A1 | 10/2010 | Alston et al. |
| 2010/0271187 A1 | 10/2010 | Uysal et al. |
| 2010/0296753 A1 | 11/2010 | Ito et al. |
| 2010/0303348 A1 | 12/2010 | Tolliver et al. |
| 2010/0308964 A1 | 12/2010 | Ackley et al. |
| 2011/0052008 A1 | 3/2011 | Holsing et al. |
| 2011/0084808 A1 | 4/2011 | Tuttle |
| 2011/0115947 A1 | 5/2011 | Oh |
| 2011/0121067 A1 * | 5/2011 | Longacre et al. ............ 235/375 |
| 2011/0128125 A1 | 6/2011 | Kai et al. |
| 2011/0143811 A1 | 6/2011 | Rodriguez |
| 2011/0205387 A1 | 8/2011 | Tzur et al. |
| 2011/0212717 A1 | 9/2011 | Rhoads et al. |
| 2011/0240741 A1 * | 10/2011 | Li et al. .................. 235/462.11 |
| 2011/0280447 A1 | 11/2011 | Conwell |
| 2011/0284625 A1 | 11/2011 | Smith et al. |
| 2011/0290883 A1 | 12/2011 | Kotlarsky et al. |
| 2012/0038456 A1 | 2/2012 | Pikkarainen et al. |
| 2012/0044074 A1 | 2/2012 | Mulla |
| 2012/0190386 A1 | 7/2012 | Anderson |
| 2012/0207395 A1 * | 8/2012 | Stratmann et al. ........... 382/195 |
| 2012/0228240 A1 | 9/2012 | Gentile et al. |
| 2012/0257025 A1 | 10/2012 | Kim et al. |
| 2012/0257795 A1 | 10/2012 | Kim et al. |
| 2012/0260163 A1 | 10/2012 | Kim et al. |
| 2012/0260208 A1 | 10/2012 | Jung |
| 2012/0262448 A1 | 10/2012 | Kim et al. |
| 2012/0272231 A1 | 10/2012 | Kwon et al. |
| 2012/0274581 A1 | 11/2012 | Kim |
| 2012/0280040 A1 | 11/2012 | Carney et al. |
| 2012/0293427 A1 | 11/2012 | Mukai et al. |
| 2012/0293556 A1 | 11/2012 | Kim et al. |
| 2012/0295634 A1 | 11/2012 | Kim |
| 2012/0295672 A1 | 11/2012 | Kim |
| 2013/0194077 A1 | 8/2013 | Vargas et al. |
| 2013/0277427 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2014/0014724 A1 | 1/2014 | Koziol et al. |
| 2014/0025542 A1 | 1/2014 | Sharma et al. |
| 2014/0027503 A1 * | 1/2014 | Kennedy et al. ............ 235/375 |
| 2014/0097247 A1 * | 4/2014 | Zumsteg ...................... 235/440 |

OTHER PUBLICATIONS

EPCglobal; "EPC™ Radio-Frequency Identity Protocols Class-1 Generattion-2 UHF RFID Protocol for Communications at 860 MHz—960 MHz;" Specification for RFID Air Interdave; Version 1.0.9; Jan. 31, 2005; pp. 1-94.

* cited by examiner

FIG. 11
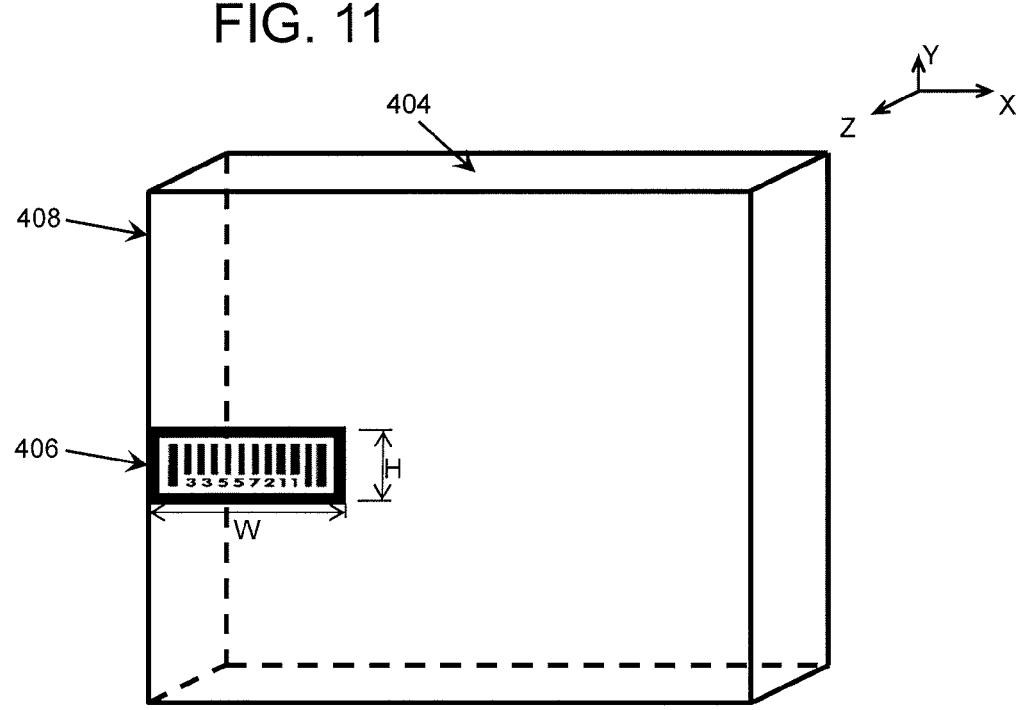
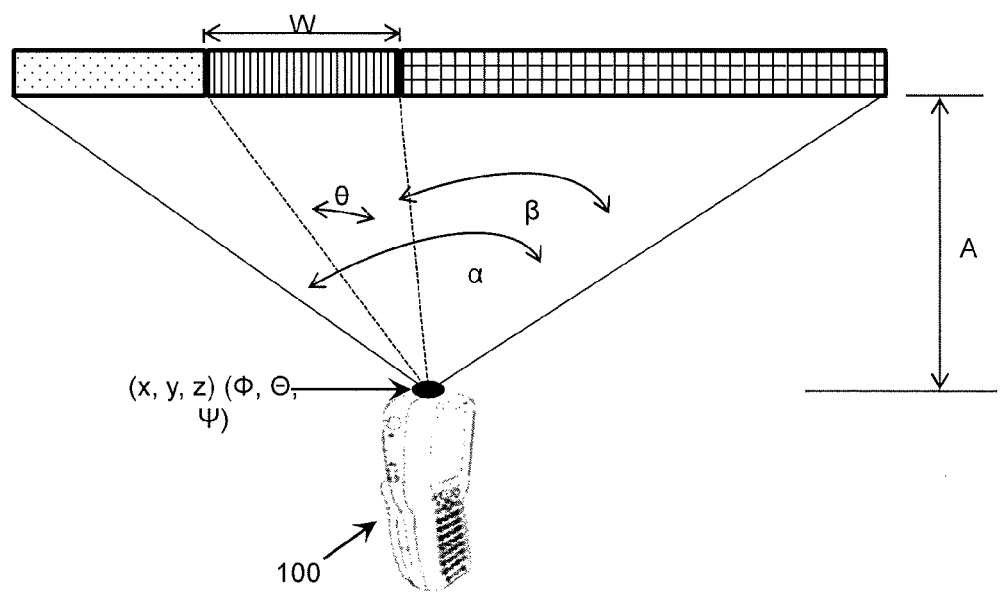

INITIAL POINT ESTABLISHMENT USING AN IMAGE OF A PORTION OF AN OBJECT

BACKGROUND

Radio-frequency identifier (RFID) methods are widely used for a number of tasks, including smart cards, supporting maintenance tasks, identification badges, tracking objects in manufacturing, retail inventory management, etc. An RFID tag can be attached, e.g., to an inventory object. An encoded information reading (EIR) terminal can be configured to read the memory of an RFID tag attached to an inventory object.

EIR terminals with integrated RFID reading capabilities can read RFID tags from a range of distances. However, it is quite time consuming for an EIR terminal to perform retail floor inventory. Additionally, one may not know whether all fixtures (and by extension, all items) in a given department have been inventoried.

SUMMARY

A reader is disclosed which determines an initial point of the reader relative to an object (e.g., a shelf at a retail store that physically supports inventory). An imager (such as a two-dimensional camera) captures an image of part of a physical structure or the object, including a decodable indicia (e.g., a custom barcode, QR code, unique design characteristic of the physical structure, or other visually encoded information). One or more images of the decodable indicia are processed and data is extracted. Image processing is performed to identify edges, orientation and, dimensions of the decodable indicia and possibly some edges of a physical structure (where the physical structure supports objects associated with transponders). Any required error correction is detected and applied to the image (i.e. keystone effect, perspective, rotation). Based on the coordinates corresponding to the physical location of the decodable indicia on the physical structure, size, and location in the image of the decodable indicia, and previously determined image correction factors, the initial spatial point and orientation of the reader relative to the physical structure and decodable indicia may be established.

In one aspect, a method of determining an initial point for a scan path may include acquiring, using a mobile device, an image of an object, the image comprising decodable indicia. Using the mobile device, data is decoded from the decodable indicia. Indicia dimensions of the decodable indicia are determined based on the data, and image dimensions of the decodable indicia in the image are determined. An initial location of the mobile device is calculated relative to the decodable indicia based on a geometric relationship between the indicia dimensions of the decodable indicia and the image dimensions of the decodable indicia in the image.

In another aspect, an apparatus is provided. The apparatus may include a mobile device configured to acquire an image of an object, and a processor configured to: decode data from the decodable indicia in the image; determine indicia dimensions of the decodable indicia based on the data, and determine an initial location of the mobile device based the obtained data and the indicia dimensions of the decodable indicia in the image. The apparatus may further include a scanner to scan for transponders supported by the object, and a motion sensing device to sense movement of the scanner so that a scan path of the can be determined. The apparatus may yet further include an interface configured to display at least of the initial point or scan path on a display device.

In yet another aspect, a method is provided to determine an initial point of the reader. Using a mobile device, an image of a retail object is captured comprising a custom barcode. The custom barcode is detected in the image, where the custom barcode contains data associated with the object. The image is processed to identify edges of the custom barcode. An initial point of the reader is established based on coordinates corresponding to a physical location of the custom barcode on the fixture and size of the custom barcode.

BRIEF DESCRIPTION OF THE DRAWINGS

FIG. 11 schematically illustrates a reader evaluating both a horizontal and a vertical plane according to one embodiment.

DETAILED DESCRIPTION OF THE EMBODIMENTS

Figure 1A:
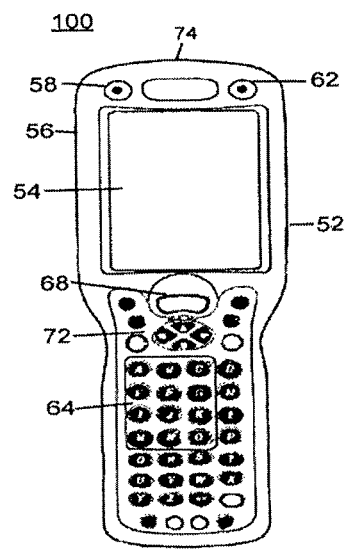
FIGS. 1A, 1B and 1C schematically illustrate one embodiment of a reader according to one embodiment.

The exemplary embodiments described herein provide detail for illustrative purposes and are subject to many variations in structure and design. It should be emphasized, however, that the present invention is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In retail facilities, objects may be placed on a plurality of different fixtures. The fixtures can be, for example, shelving units, linear clothing racks, non-linear clothing racks, tables with one or more surfaces, or any combination thereof. Employees are often tasked to periodically determine the current status of inventory within the facility. One option for determining inventory status is to tag each object with an RFID tag and for an employee to approach a fixture with an EIR terminal that includes a processor, a memory, an RFID tag reading device, a motion sensing device such as an Inertial Measurement Unit (IMU), a communication interface, and a camera system. The employee moves the EIR terminal along a scan path while performing the inventory status process. Periodically obtained location and orientation data points are used to map the location of the EIR with respect to the fixture in three dimensional (3D) space. In order to properly calculate the 3D scan path, the initial point (IP) of the scan path must be calculated.

In one embodiment, there is provided an encoded information reading (EIR) terminal comprising a radio frequency identifier (RFID) reading device. The EIR terminal can be configured to read decodable indicia such as RFID tags containing encoded messages. In one embodiment, the EIR terminal can be configured to read an RFID tag containing an encoded message and output raw message data containing the encoded message. In another embodiment, the EIR terminal is configured to read an RFID tag containing an encoded message and output decoded message data corresponding to the encoded message.

It should be noted that the EIR terminal is referred to herein for ease of illustration. However, it should be understood that the EIR terminal may be any reader (such as an RFID reader with a camera) and should not be limited.

Various embodiments of the EIR terminal can be used in a numerous applications, including but not limited to, authentication and access control systems (for example, using smart cards), object tracking in manufacturing and retail, etc. A smart card is an identification card (e.g., a credit card, a pass card) which does not need to be swiped or otherwise physically contacted by a card reader. This capability can be implemented by placing an RFID tag in the card. Object tracking can be implemented by placing an RFID tag on each individual object. In retail, object tracking with RFID tags can be used in conjunction with other technologies such as bar code scanning and payment terminals. Object tracking with RFID tags can be used in loss prevention systems by placing an RFID tag into merchandise objects and placing sensors at exit points. If an exit sensor detects a tagged object with a tag, which was not deactivated at the checkout, an alarm can go off.

One embodiment of EIR terminal 100 is shown in FIG. 1A (front panel view), 1B (side panel view), and 1C (bottom panel view). EIR terminal 100 can comprise housing 52 within which other components of EIR terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Camera lens 74 of the camera system 353 can be disposed on the top panel of housing 52. Disposed on the side panel (best viewed in FIG. 1B) can be infrared communication port 76, access door to a secure digital (SD) memory interface 78, audio jack 80, and hand strap 82. Disposed on the bottom panel (best viewed in FIG. 1C) can be multi-pin mechanical connector 84 and hand strap clip 86. In one embodiment, camera lens 74 may include a fisheye lens or other lens intended to provide a panoramic view to ensure that a user can captures sufficiently large images of fixtures arranged close to one another (e.g., in an aisle between fixtures).

Figure 1B:
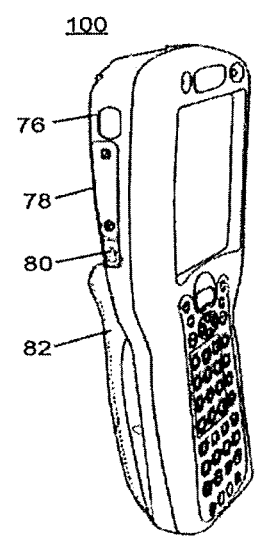
Figure 1C:
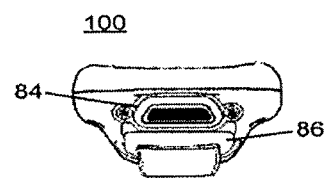

While FIGS. 1A-1C illustrate a hand held housing, a skilled artisan would appreciate the fact that other types and form factors of terminal housings are within the scope of this disclosure.

Figure 2:
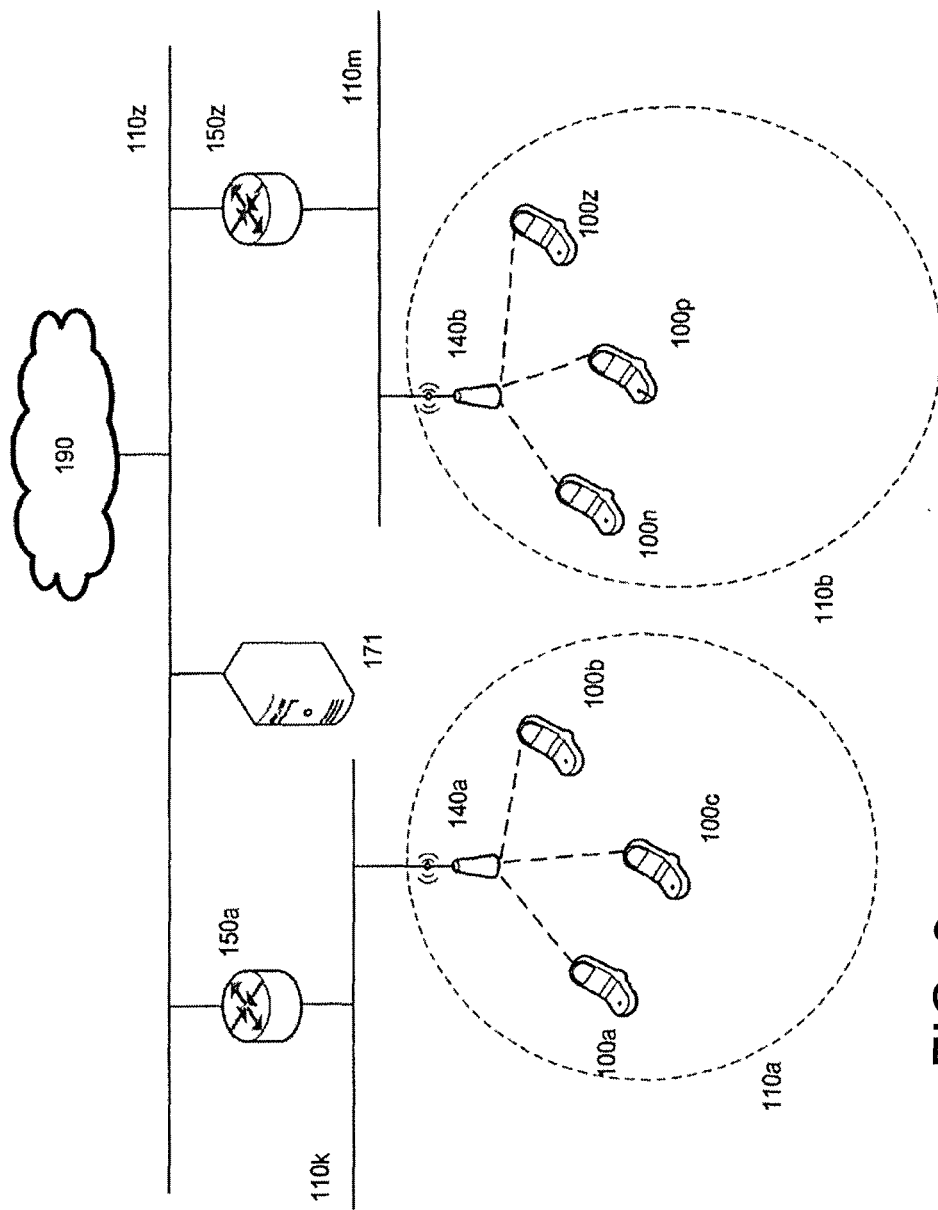
FIG. 2 depicts a network-level layout of a data collection system utilizing readers according to one embodiment.

In a further aspect, the EIR terminal can be incorporated in a data collection system. The data collection system, schematically shown in FIG. 2, can include a plurality of routers 150a-150z, a plurality of access points 140a, 140b . . . 140z, and a plurality of EIR terminals 100a-100z in communication with a plurality of interconnected networks 110a, 110b . . . 110z. In one aspect, the plurality of networks 110a-110z can include at least one wireless communication network. In a further aspect, an EIR terminal can comprise a communication interface which can be used by the terminal to connect to one or more networks 110a-110z. In one embodiment, the communication interface can be provided by a wireless communication interface.

The EIR terminal 100c can establish a communication session with the host computer 171. In one embodiment, network frames can be exchanged by the EIR terminal 100c and the host computer 171 via one or more routers 150, base stations, and other infrastructure elements. In another embodiment, the host computer 171 can be reachable by the EIR terminal 100c via a network 190, such as a local area network (LAN). In a yet another embodiment, the host computer 171 can be reachable by the EIR terminal 100c via a network 190, such as a wide area network (WAN). A skilled artisan would appreciate the fact that other methods of providing interconnectivity between the EIR terminal 100c and the host computer 171 relying upon LANs, WANs, virtual private networks (VPNs), and/or other types of network are within the scope of this disclosure.

In one embodiment, the communications between the EIR terminal 100c and the host computer 171 can comprise a series of HTTP requests and responses transmitted over one or more TCP connections. In one embodiment, the communications between the EIR terminal 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the EIR terminal can include decoded message data obtained from decodable indicia 406 (e.g., a bar code label or an RFID label) attached to a product or to a shipment object or to a fixture. For example, an EIR terminal can transmit a request to the host computer to retrieve product information corresponding to a product identifier encoded by a bar code label attached to the product, or to transmit a product tracking record for a product identified by a bar code label attached to the product. In another example, an EIR terminal can transmit a request to the host computer to retrieve information about the fixture.

Figure 3:
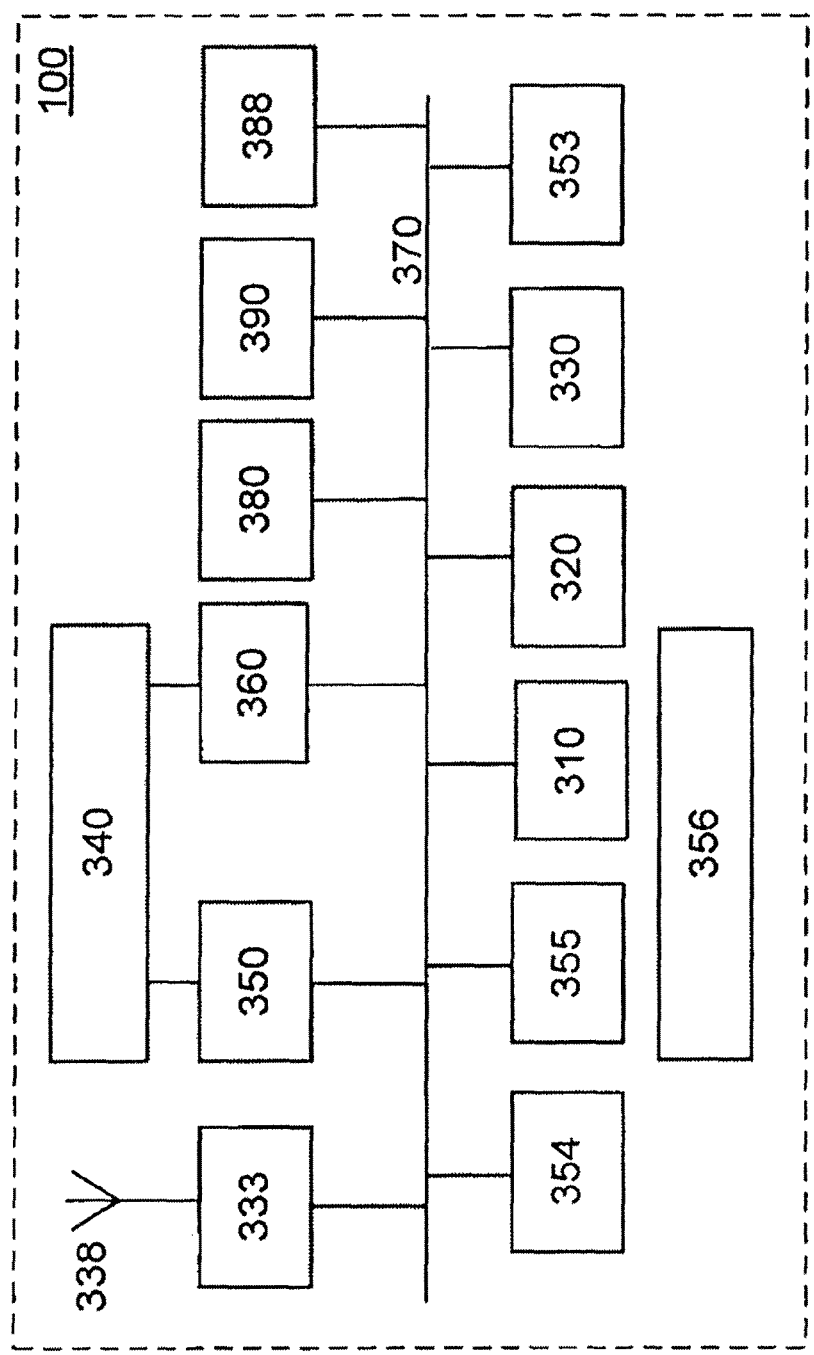
FIG. 3 depicts component-level layout of a reader according to one embodiment.

Component-level diagram of one embodiment of an EIR terminal is now being described with references to FIG. 3. EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family. Module 360 is an additional modular component that can replaced with upgraded or expanded modules and is disposed between the system bus 370 and communication interface 340. This module 360 is compatible with, for example, auxiliary hard drives (including flash memory), RAM, communication interfaces, etc.

EIR terminal 100 can further comprise a camera system 353 and an image interpretation and processing module 388. In one embodiment, the image interpretation and processing module 388 receives image data from camera system 353.

EIR terminal 100 can further comprise a keyboard interface 354 and a display adapter 355, both also coupled to the system bus 370. EIR terminal 100 can further comprise a battery 356. In one embodiment, the battery 356 can be provided by a replaceable rechargeable battery pack.

EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330, provided, for example, but not limited to, by an RFID reading device, a bar code reading device, or a card reading device. In one embodiment, the RFID terminal can be configured to read an encoded message from a decodable indicia 406 using EIR device 330, and to output raw message data containing the encoded message. In another embodiment, the RFID terminal can be configured to read an encoded message from a decodable indicia 406 using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code. An encoded message can also be used to convey information about a fixture, such as the fixture dimensions and configuration of storage available for products.

Of course, devices that read bar codes, read RFID tags, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smar iphone, or PDA that is capable of reading bar codes is a device that read bar codes for purposes of this disclosure.

As noted herein supra, in one embodiment, EIR terminal 100 can further comprise an RFID reading device 333. EIR terminal 100 can be configured to read RFID tags containing decoded messages. In one embodiment, the RFID terminal can be configured to read, using RFID reading device 333, an RFID tag containing an encoded message, and to output raw message data containing the encoded message. In another embodiment, the RFID terminal can be configured to read, using RFID reading device 333, an RFID tag containing an encoded message, and to output decoded message data corresponding to the encoded message.

In a further aspect, the RFID reading device can comprise an antenna 338.

Figure 12:
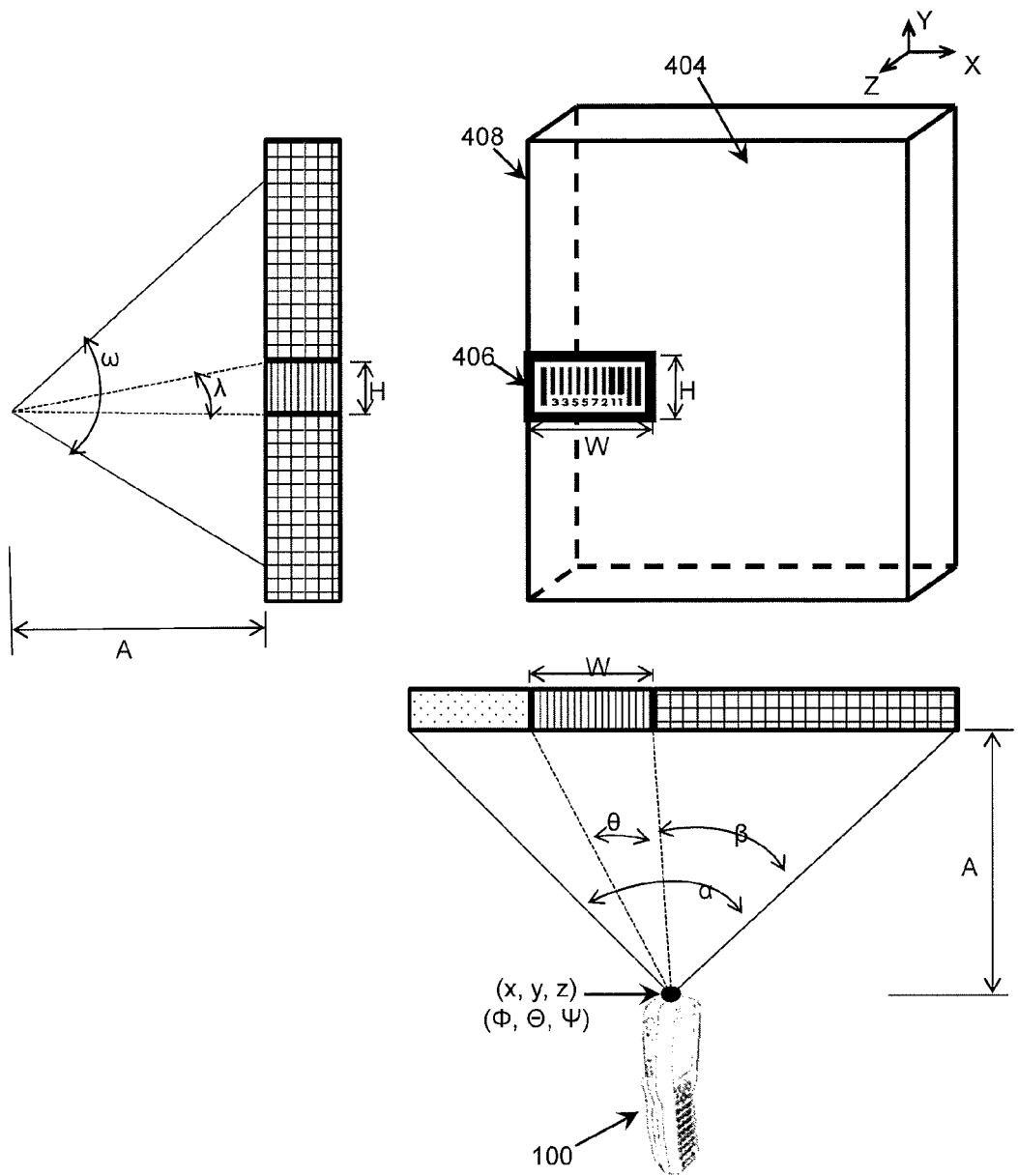
FIG. 12 schematically illustrates an interaction between a reader and a physical structure where the location of the reader is a function of both orientation and the location of the decodable indicia according to one embodiment.

In another embodiment of the present invention, the EIR terminal 100 includes an IMU 350 (containing at least 3-axis accelerometer and 3-axis gyroscope sensors which may provide orientation) utilized to record both the location of the EIR terminal 100 in three dimensional space and record the initial point coordinates, the IMU 350 also assists the EIR terminal 100 in determining the orientation of the EIR terminal 100, both during the process of establishing the IP and as it moves through space. The orientation of the EIR terminal 100 describes the position of the EIR terminal 100 itself relative to physical structure as shown in FIG. 12. For example, an EIR terminal 100 can be at a given location, for example $(x_1, y_1, z_1)$ but the orientation of the EIR terminal at this location may vary. The EIR terminal may be held perfectly upright at this location to define one orientation, but the EIR terminal may also be moved to an angle relative to any direction in three dimensional space (while the location is unchanged). This movement represents a change in orientation. In one embodiment, during the process of establishing the IP and when the EIR terminal 100 in moved relative to the initial point, both the location and the orientation of the EIR terminal 100 are calculated by the camera system 353 and/or the IMU 350 and the resultant data is stored in a resource, including but not limited to an internal resource in the EIR terminal 100 and/or an external memory resource accessible to the EIR terminal 100 via a communications connection.

In one embodiment, the EIR terminal 100 may also include a laser scanner for scanning a barcode.

Described herein is a method for establishing the initial point (IP) for a scan path of an EIR terminal 100. As mentioned above, the EIR terminal 100 is configured to scan an area of a fixture for transponders, such as RFID tags, and/or decodable indicia, such as bar codes. The scan path of an EIR terminal relates to a path that the EIR terminal scans from a first point to a second point, in one embodiment, and in another embodiment, the scan path relates to the complete path that the EIR terminal takes from start to finish. The EIR terminal may scan the fixture starting at a specifically-desired location (or at a random location) and continuously moving the focal point of the EIR terminal to other portions of the fixture. Such path from a first location on the fixture to other locations on the fixture may be a scan path, as used herein, according to one embodiment. It should be noted that the scan path may be continuous or non-continuous.

Figure 4:
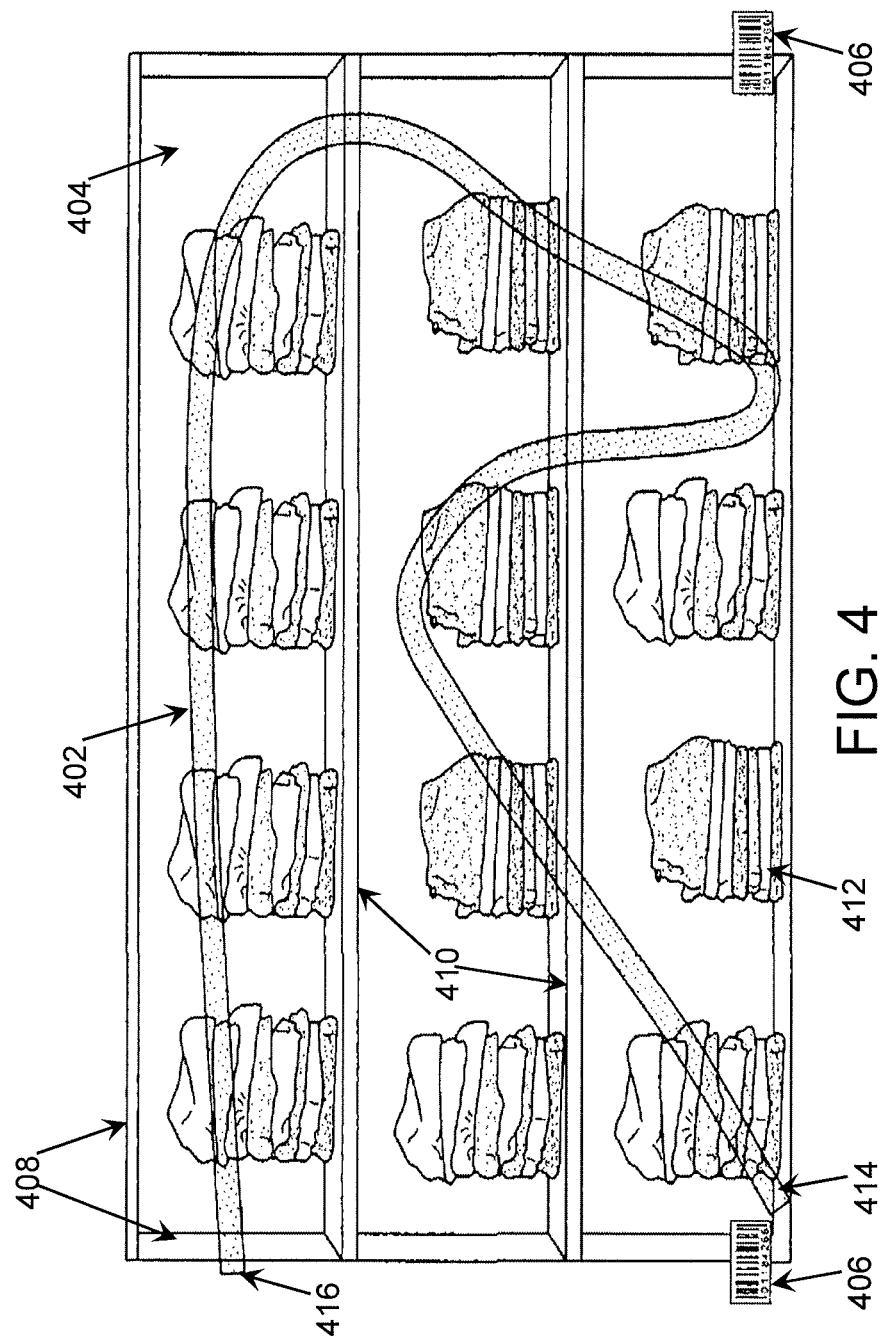
FIG. 4 schematically illustrates a scan path of a fixture or physical structure according to one embodiment.

FIG. 4 schematically illustrates an example of a scan path 402 of a fixture 404 according to one embodiment. As shown in FIG. 4, one embodiment of a scan path 402 is shown graphically superimposed on an image of a fixture 404. Such superimposition is graphically displayed on the EIR terminal 100 so that the user can view a virtual representation of the scan path 402 relative to a predetermined image of a fixture. This allows the user to ascertain where the EIR terminal has scanned relative to the fixture. The scan path is a path of the RF antenna pattern from the EIR terminal where it intersects the front plane of a physical structure (i.e., a retail store display fixture). The diameter of the scan path point is a function of the RFID antenna pattern, RF transmit power level, and separation distance and orientation between the EIR terminal and the front plane of the physical structure.

In one embodiment, at least one decodable indicia 406 is disposed (e.g., attached) to the fixture 404. The fixture 404 may include external edges 408 on sides thereof and may also include multiple shelves 410 each holding multiple objects 412. In one embodiment, scan path 402 represents a focal point of the image captured by the EIR terminal (e.g., a center of the area where the EIR terminal is scanning) as the user moves the EIR terminal 100 with respect to the fixture 404.

In the embodiment of FIG. 4, the EIR terminal (not shown in FIG. 4) begins the scan path 402 at 414 and ends the scan path 402 at the upper left-hand portion 416 of the fixture 404. The scan path 402 may not require physical contact or that the EIR terminal 100 is brought within a close proximity of the decodable indicia 406 to perform the necessary image processing. A method of determining an initial point for a scan path that is used to map the location of at least one object (e.g., shirts, pants, packaged products, etc.) arranged on a fixture 404 in three dimensional space relative to the initial point in three dimensional space may use the EIR terminal 100 that may include a processor, a memory, a scanning device, a motion sensing device, a communication interface, a camera system 353, or any combination thereof.

FIGS. 5-7, 9, and 10 describe various portions of a method relating to scanning a fixture using an EIR terminal 100 according to some embodiments. Each of these figures is discussed in more detail below.

Figure 5:
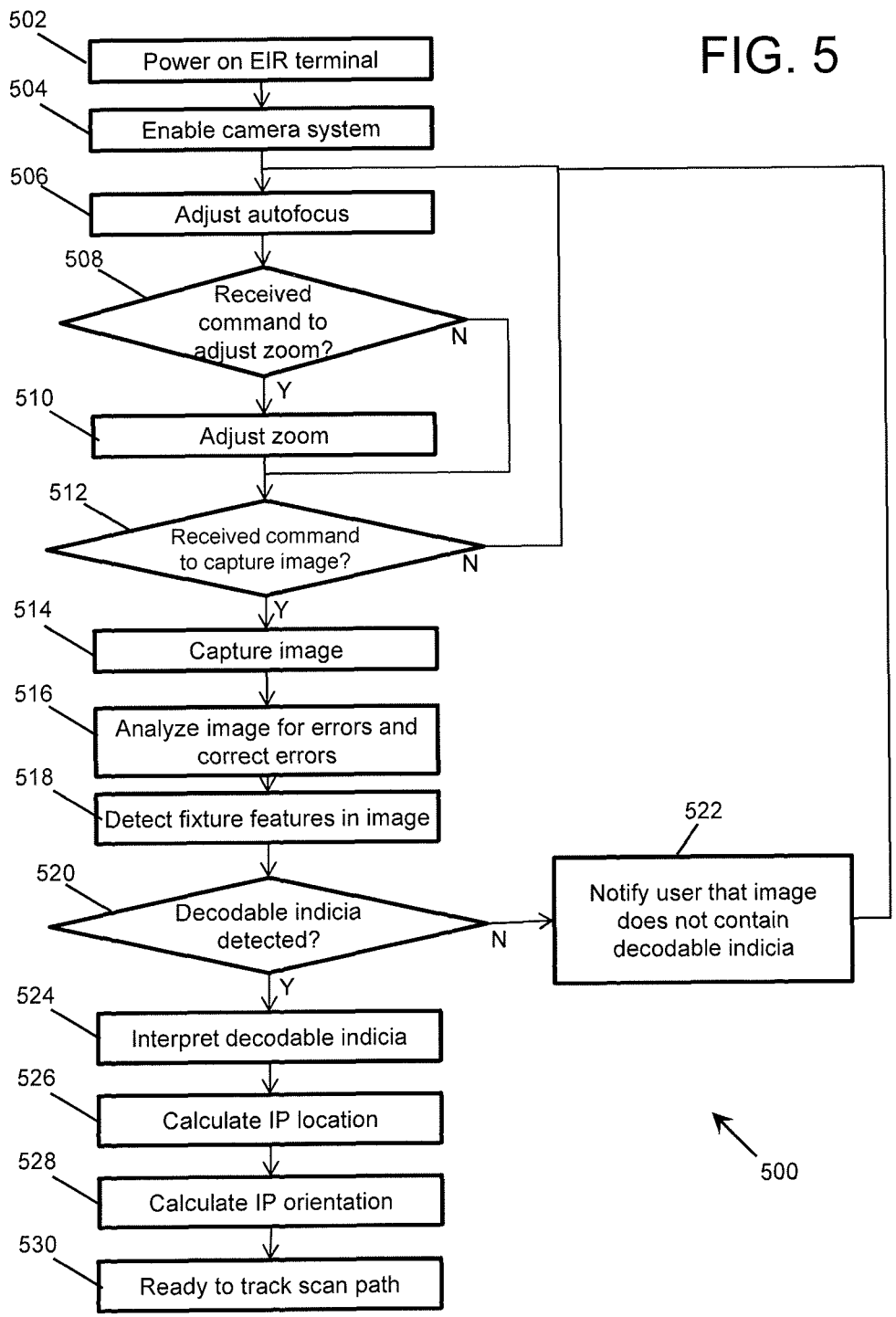
FIG. 5 illustrates a method for defining the initial point location and orientation in a scanning process according to one embodiment.

FIG. 5 illustrates a method 500 for defining an initial point in a scanning process according to one embodiment. As shown in FIG. 5, in one embodiment, the EIR terminal 100 is powered on in 502, and the camera system 353 is enabled in 504. If necessary, in 506, the EIR terminal 100 adjusts the focus of the camera system 353 in 508 so that an image of the fixture is substantially focused.

At 510, a determination is made as to whether the zoom of the camera system 353 is acceptable. If necessary, the zoom is adjusted in 512. The user may desire to zoom in on the fixture or physically move closer to the fixture based on whether the fixture is too small relative to the display screen (or other parameter) of the EIR terminal. The EIR terminal should zoom in on the fixture to the extent that a barcode on the fixture can be scanned and deciphered according to one embodiment.

If the user (or the EIR terminal 100) determines that the image from the camera system 353 need not be enlarged, and thus, no zoom is needed, method 500 may proceed to block 514. However, if necessary, the zoom may be adjusted in 512 so that the camera system 353 enlarged the image of the fixture to a desired size. It should be noted that the camera system 353 need not require focusing or zoom and as such, the method 500 may skip blocks 508 and/or 512.

In one embodiment, the process determines whether the system 100 has received a command from the user to capture an image of the fixture 500 in 514. If not, the process may return to 506 or 508 to continue to zoom or adjust the image as desired. The EIR terminal 100 may receive such command as a button on the EIR terminal being depressed or activated by a user.

At block 516, in response to receiving a command or input to capture an image, the EIR terminal 100 activates the camera system 353 to capture an image of the fixture. The image is them received by the camera system 353 and stored into memory on the EIR system 100. The image may be a digital image. The EIR system 100 analyzes the image for errors and corrects errors in 518. The steps within 518, for one embodiment, are detailed in more depth in FIG. 6, as discussed later.

At 520, the EIR terminal 100 analyzes and detects in the image for the presence of recognizable features of the fixture 404 (e.g., part of an external edge 408 or a part of shelf 410 of a fixture 404). This is done by the EIR terminal 100 scanning the image for these and other features. For example, the EIR terminal scans the image to identify the type of fixture based on the fixture feature. By way of another example, the EIR terminal scans the image to determine if any decodable indicia 406 is present. This may be done by determining if any item is of the size and shape of decodable indicia 406 as well as if such location includes a series of black and white bars, for example. Regardless, the features of the fixture and other features associated therewith are identified by the EIR terminal (or a computing system).

In block 522, a determination is made as to whether the image contains decodable indicia 406. If the image does not contain decodable indicia 406, the EIR terminal 100 alerts the user and may return to block 506, for example, to take another image. However, if decodable indicia 406 is detected to be present in the image, the method 500 may proceed to 526 where the decodable indicia 406 is interpreted. Block 526, for one embodiment, is detailed in FIG. 7, as discussed later. In general, the decodable indicia is interpreted to determine the data contained therein, and such data may provide various information about the fixture.

Once interpretation of the decodable indicia is complete, the method 500 may continue to 528 and 530 where the location of the EIR terminal 100 (e.g., the initial point) and the orientation of the EIR terminal 100, respectively, is calculated with respect to the fixture 500. The steps for 528 and 530, in some embodiments, are detailed in FIG. 11 as discussed later.

At block 532, the EIR terminal 100 scans the fixture and tracks the scan path 402 of such scanning. This is done by tracking the movement of the EIR terminal 100 relative to the fixture 404. The movement of the EIR terminal's focal scanning point is then mapped into a corresponding image of the fixture (or a generic fixture image) to graphically represent on the EIR terminal the scan path of the EIR terminal's focal scanning point. This allows the user to know where the EIR terminal has scanned so that the user knows the positions on the fixture which have not been scanned.

Figure 6:
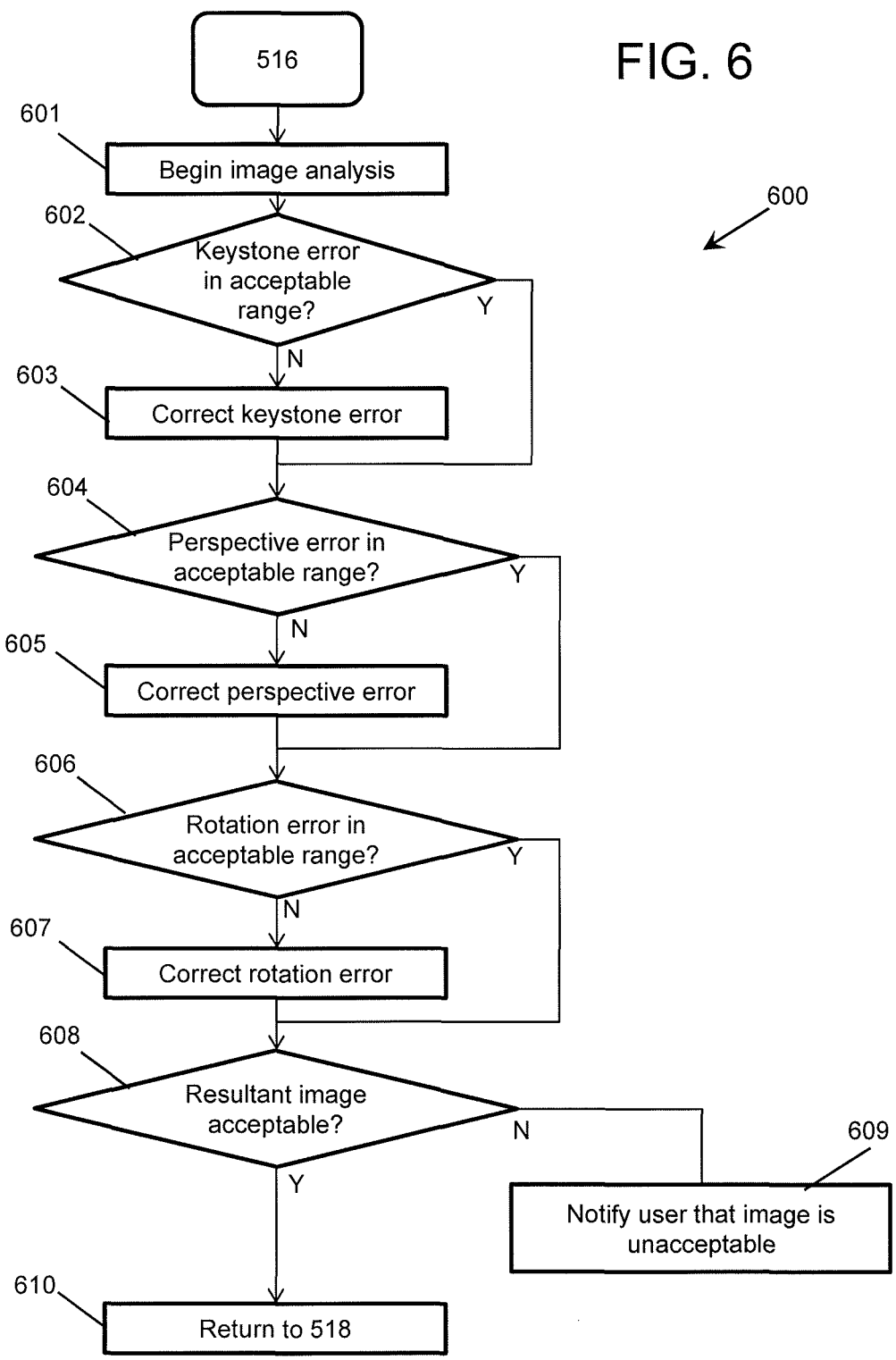
FIG. 6 illustrates a method for image error detection and error correction processes according to one embodiment.

As mentioned above, in block 518 of FIG. 5, the EIR terminal analyzes the image for errors and corrects such errors. FIG. 6 illustrates a method 600 for image error detection and error correction processes according to one embodiment. In FIG. 6, the image analysis begins in block 601. This occurs by performing various checks on the image. For example, a check to determine whether the image is rotated relative to a home position to determine if an error is present. As such, the EIR terminal detects whether various image errors are present (e.g., keystone error, perspective error, and rotation error in 602, 604, and 606, respectively). For each error type, if the error is detected, the error is corrected (see 603, 605, and 607, respectively). This list of image errors is not intended to be exhaustive. Other errors related to characteristics such as, for example, contrast can also be detected and corrected. The errors may be individually corrected based on the error type. For example, if the error is a rotation error, the image may be rotated so that the image is rotated back to a home position. For each image error type, the associated correction factor may be used to determine the IP location of the EIR, in block 528, or the orientation of the EIR at the IP in block 530. After the method 600 of FIG. 6 has completed, the method may return back to 520 of FIG. 5.

Figure 7:
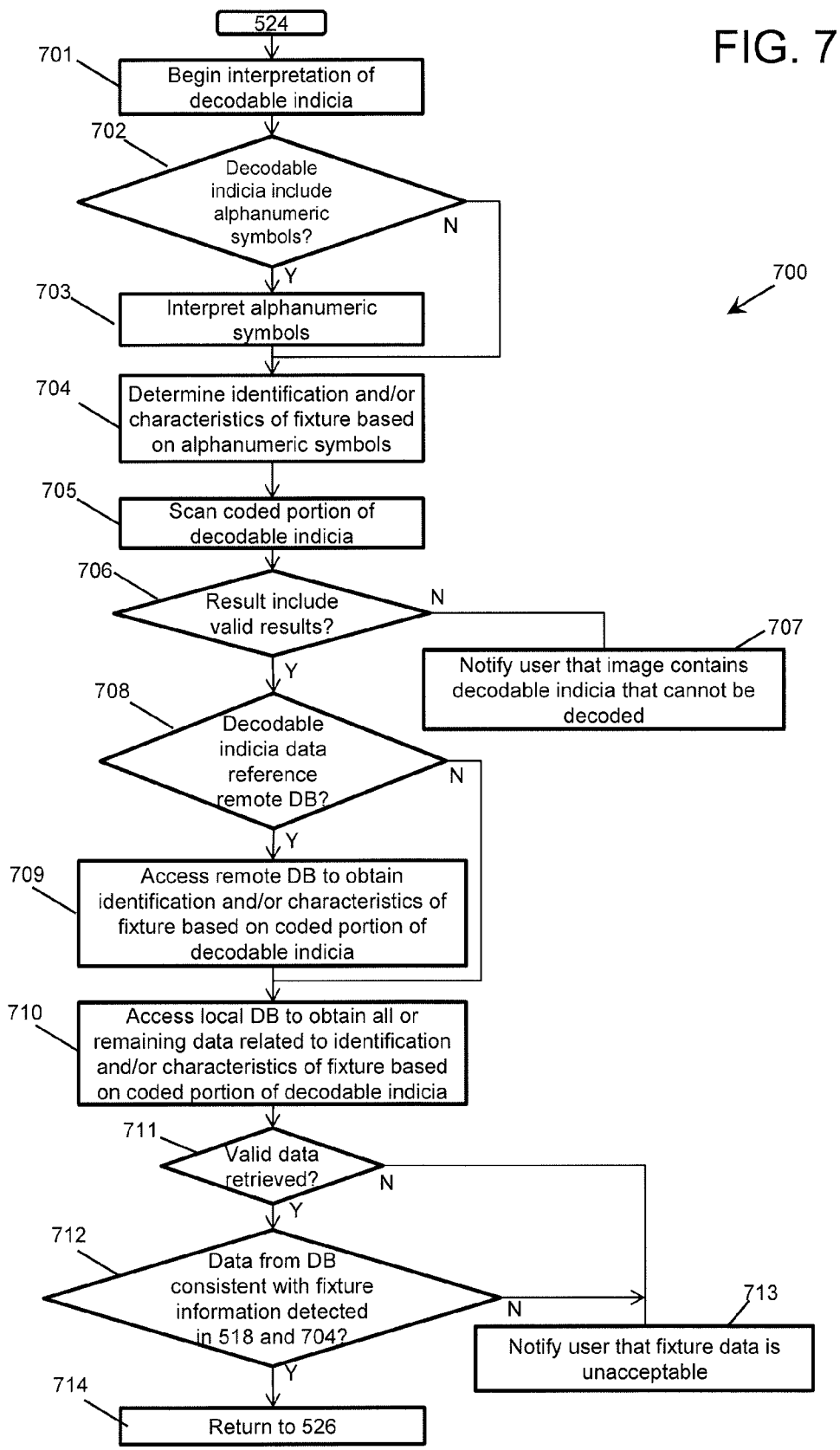
FIG. 7 illustrates a method for interpreting decodable indicia according to one embodiment.
Figure 8A:
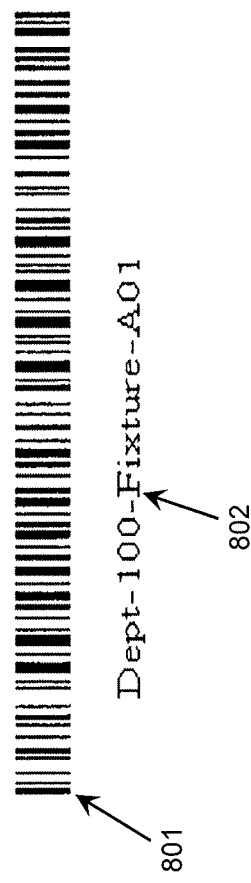
FIGS. 8A and 8B schematically illustrate a decodable indicia according to some embodiments.
Figure 8B:
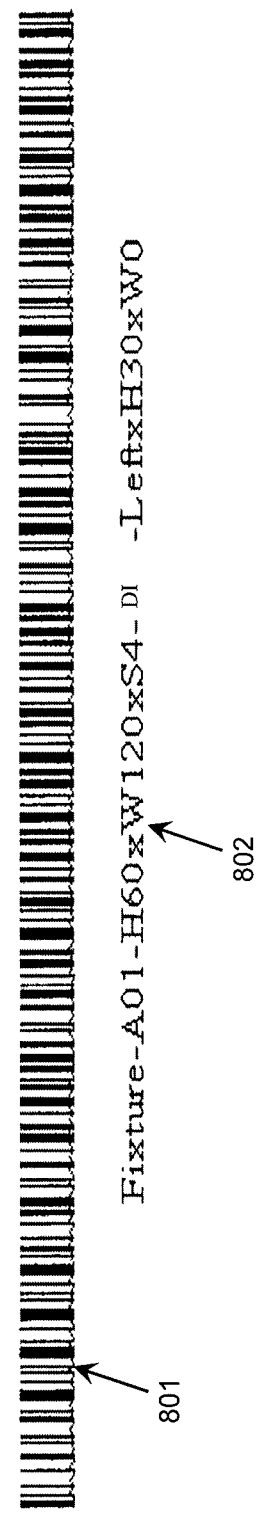

As mentioned above, in block 526 of FIG. 5, the decodable indicia is interpreted, which is illustrated by the method described in FIG. 7 according to one embodiment. In 701 (FIG. 7), the interpretation of the decodable indicia begins by obtaining the decodable indicia from memory of the EIR terminal (based on e.g., (1) scanning a barcode with a laser scanner, (2) interpreting an image from the EIR camera system containing a barcode/QR code, and (3) using the RFID reader to obtain data from an RFID tag on the fixture). The decodable indicia may include an alphanumeric portion 802 and a coded portion 801 as illustrated in FIGS. 8A and 8B. The coded portion 801 and the alphanumeric portion 802 may include information related to the fixture, such as the dimensions of the fixture, dimensions of the decodable indicia area, location of the decodable indicia area, etc. As an example, alphanumeric portion 802 in FIG. 8B indicates that the fixture in question is identified as "A01," the fixture is 60" tall and 120" wide with four shelves each spaced 12" apart, and the decodable indicia is located adjacent to the left hand side external edge 30" above the ground. The presence of the alphanumeric portion 802 is determined in 702 of FIG. 7. If present, the alphanumeric portion 802 is interpreted by the EIR terminal 100 in 703 and information related to the fixture is extracted in 704.

After information related to the alphanumeric portion 802 is extracted (or if no alphanumeric portion 802 is present), the process 700 may proceed to 705 where the coded portion 801 of the decodable indicia is scanned and decoded by the EIR terminal. The decoding process in 705 can be specific to a bar code or to an RFID tag (or any other type of decodable indicia). In addition, 705 may provide data related to the fixture in addition to or in lieu of data provided in earlier steps. The system 100 determines if the decodable indicia is properly decoded and read in block 706.

If the decodable indicia is not properly decoded or does not provide decipherable data, the user is notified and the process may return to 506.

On the other hand, if the decodable indicia is properly decoded and read, the EIR terminal determines whether the decodable indicia 406 includes data relating to a reference to a remote database ("DB") in 708. The decodable indicia may include such a reference to a remote database so that the data contained in the decodable indicia can be properly deciphered. If the decodable indicia is not properly decoded and read, the process 700 may proceed to 710. However, if the decodable indicia includes a reference to the remote database, the remote database is accessed in 709 to obtain relevant data for the fixture 404 (this step can be skipped if no remote database is referenced in 708).

At 709, the local DB is accessed. In the case where no remote database was accessed (e.g., the process skips 709), data relevant to the fixture (that was not obtained in 704) may be obtained in 710. In the case where a remote database is accessed (e.g., the process does not skip 709), either (1) some additional fixture data is obtained in 710 or (2) no data will be obtained in 710. The information obtained from the DB can include numerous types of data. For example, the DB may specify the exact dimensions of the fixture, the location of the fixture within the store, a preferred origin for the fixture, an expected amount of inventory associated with the fixture, the location of the decodable indicia 406 with respect to the fixture, the exact dimensions of the decodable indicia 406, the physical dimensions of an alphanumeric portion 802 of the decodable indicia 406, etc.

In 711, a determination is made as to whether the data retrieved from the DB(s) is valid. Data retrieved from the DB is determined to be invalid if there is no data in the remote database corresponding to the data extracted from the decodable indicia. If the data is not valid, the user is notified and the process returns to 506. If the data is valid, however, the EIR terminal 100 checks whether the data is consistent with the information obtained in 520 and 704, as provided in 712. If the data retrieved from the DB is not consistent with the data obtained in 520 and 704, the user is notified and the process returns to 506; otherwise, the process may continue to 528.

In one embodiment, the initial point (IP) refers to the 3D location $(x_1, y_1, z_1)$ and orientation $(\Phi_1, \Theta_1, \Psi_1)$ of the EIR terminal in space (see FIG. 12). In one embodiment, as illustrated in FIG. 12, the location $(x_1, y_1, z_1)$ is a function of orientation $(\Phi_1, \Theta_1, \Psi_1)$ and a function of the location of the decodable indicia $(x_0, y_0, z_0)$.

Figure 9:
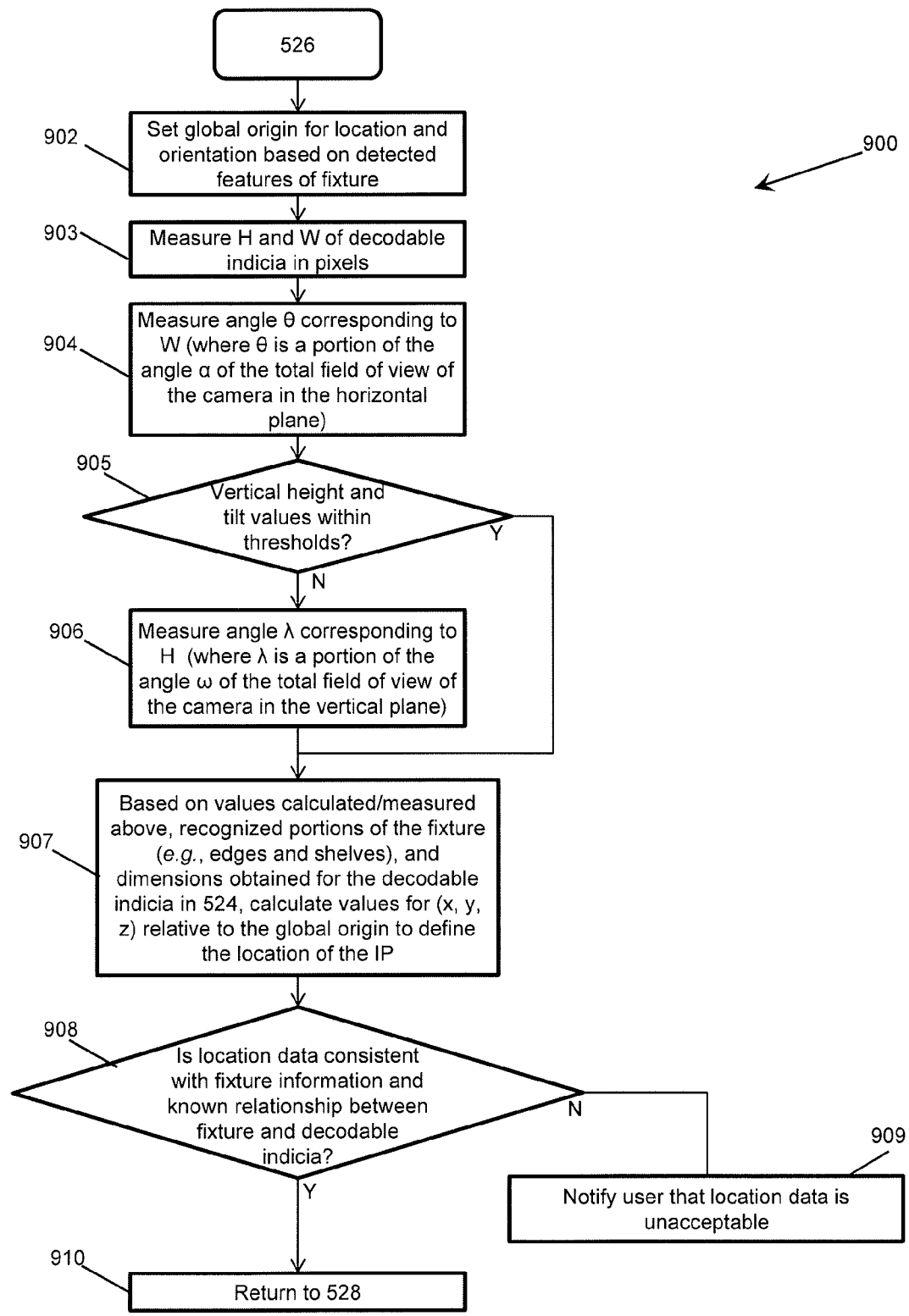
FIG. 9 illustrates a method for calculating an initial point location in a scanning process according to one embodiment.

As mentioned above with regard to block 528, the IP location of the EIR terminal is calculated. This allows the system 100 to determine the absolute coordinates of the EIR terminal in one step of determining the initial point of scanning on the fixture. FIG. 9 illustrates a method 900 for calculating the initial point location according to one embodiment.

At 902, a global origin is established for location and orientation. Such origin is the home position for location and may be where (x, y, z) coordinates equals (0, 0, 0). The location for the origin is typically based on one or more geometric features of the fixture 404 (e.g., edge 408 or shelf 410 previously discussed in FIG. 4). For example, the origin of a fixture may be set to be a point on the fixture. It should be noted that x, y, and z directions are illustrated at the legends in FIGS. 11 and 12. In this regard, the y-direction illustrates a vertical direction while x and z directions are horizontal directions.

In step 903, the EIR terminal 100 measures image dimensions (e.g., the height and width) of the decodable indicia in pixels (e.g., "H" and "W", respectively, as illustrated in FIG. 11). The magnification of the lens in the camera system 353 determines the relationship between the physical dimensions of the decodable indicia and the pixel counts, as a function of distance between the lens and the decodable indicia. For example, if the decodable indicia is a barcode sticker, the height and width of the barcode sticker (or the barcode itself) are measured by the EIR terminal 100. In another example, if the physical dimensions of the decodable indicia 406 are obtained by processing the decodable indicia, and the magnification of the lens in the camera system 353 is known, then the image processing 388 can determine the distance between the lens and the decodable indicia, where such distance is used in determining the IP of the EIR terminal.

At 904, while the EIR terminal 100 views the decodable indicia 406 in a horizontal plane (see FIG. 11), the EIR terminal 100 measures the angle θ, which corresponds to the viewing angle of the camera needed to encompass the width W of the decodable indicia 406 (where θ is less than the total viewing angle of the camera lens in the horizontal plane, α). It should be noted that angle θ may be measured by the EIR terminal or calculated. In one embodiment, the angle θ may be calculated based on knowing the width of the barcode (from the data in the decodable indicia), the width of the fixture (also from the data in the decodable indicia), and measuring the width of the barcode and/or fixture.

The process 900 also assesses the vertical height and tilt information of the EIR terminal 100 to determine whether the process above should be repeated for the vertical plane. For example, if the camera lens is significantly higher or lower (e.g., has a higher or lower y value in the Y-direction relative to the global origin) than the decodable indicia 406, the EIR terminal may determine that the height and tilt values are not within predefined thresholds such that the process proceeds to 906. On the other hand, if the values are within the predefined thresholds, the process may proceed directly to 907 (e.g., 906 would be skipped).

In 906, the process measures the angle λ, which corresponds to the viewing angle of the camera needed to encompass the height H of the decodable indicia 406 (where λ is less than the total viewing angle of the camera lens in the vertical plane, ω). In step 907, the EIR terminal 100 considers all the values calculated and measured in steps 903, 904, and 906 in addition to fixture information obtained in 520 and 526 and uses this data to calculate a location $(x_1, y_1, z_1)$ of the camera relative to the global origin (0, 0, 0). This location $(x_1, y_1, z_1)$ is the IP according to one embodiment.

At 908, the EIR terminal 100 determines whether the calculated location is consistent with known fixture information and the known relationship between the location of the decodable indicia 406 and the fixture (from data from the decodable indicia). If the resultant location data is not sufficiently consistent with the known data, the user is notified and the process may proceed back to 506. If the calculated location of the EIR terminal is sufficiently consistent with the known data, the process may proceed to 910 and subsequently to 530.

Figure 10:
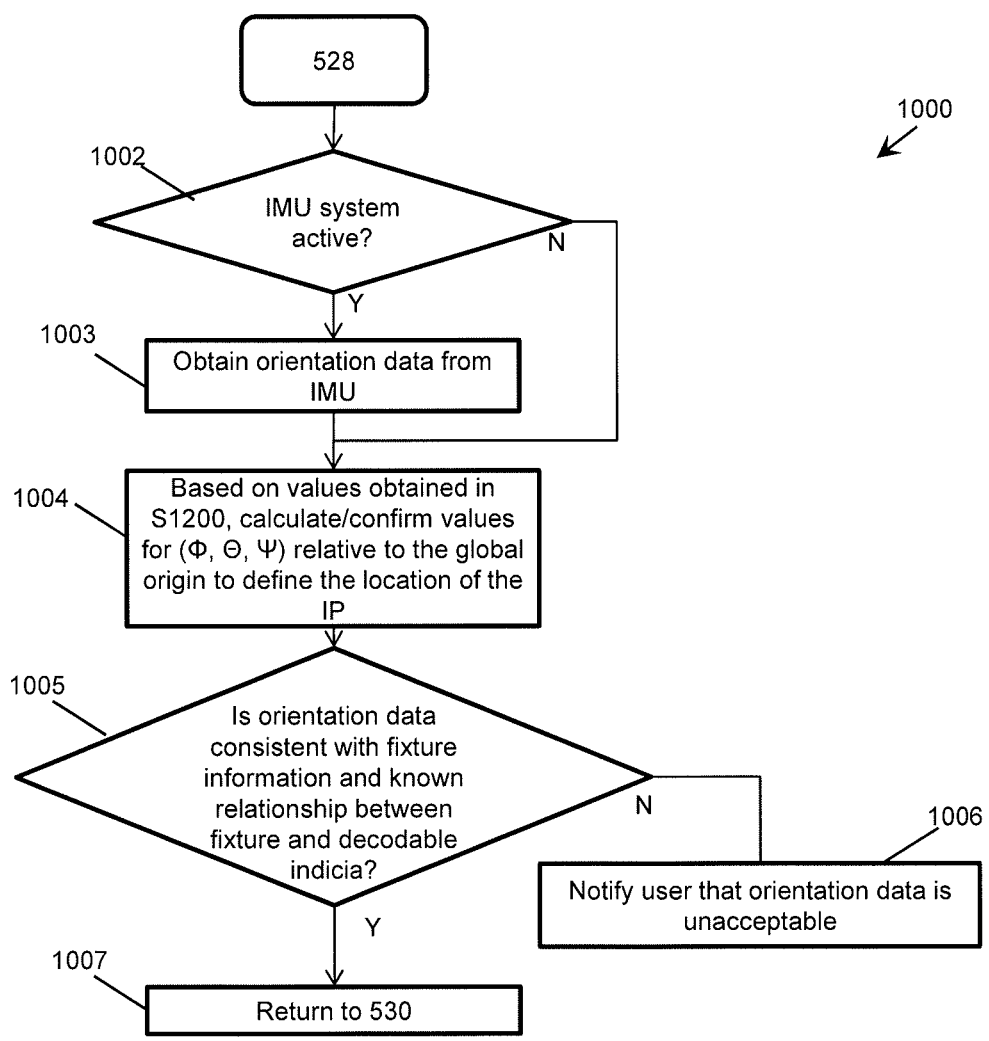
FIG. 10 illustrates a method for calculating the initial point orientation according to one embodiment.

As mentioned above with regard to block 528, the IP location is calculated. Once such calculation is determined, the IP orientation of the EIR terminal is be accessed. In this regard, both the IP location and IP orientation is known so that the location and orientation of the EIR terminal is determined. This allows the system to understand the exact location of the focal scanning point of the EIR terminal is relative to the fixture. FIG. 10 illustrates a method 1000 for calculating the initial point orientation according to one embodiment. In step 1002, a determination is made as to whether the IMU 350 is active and functioning. If IMU 350 is functioning, the IMU 350 generates orientation data in step 1003 based on sensors configured to determine the orientation of the EIR terminal 100. If IMU 350 is not functioning, the process skips 1003 and proceeds to 1004 where orientation values ($\Phi$, $\Theta$, $\Psi$) are calculated using the values obtained/calculated in 528. In the case where data is obtained from IMU 350 in 1003, the calculations in 1004 are used to confirm the data obtained from IMU 350. The process 1000 then proceeds to 1005 where the EIR terminal 100 determines whether the orientation data is consistent with known fixture information and the known relationship between the location of the decodable indicia 406 and the fixture. If the resultant orientation data is not sufficiently consistent with the known data, the user is notified and the process proceeds back to 426. If so the method 1000 may proceed to 532 where the process is ready to begin tracking a scan path. In one embodiment, the EIR terminal 100 captures images at 30 frames/second (FPS), and the EIR terminal 100 location and orientation are determined from each captured image.

FIG. 11 schematically illustrates an EIR terminal evaluating a horizontal plane (x-y plane) according to one embodiment. In particular, FIG. 11 illustrates an embodiment where the EIR terminal 100, using camera system 353, isolates and views the horizontal plane including the decodable indicia 406 (e.g., as discussed above with regard to 904). In this embodiment, the decodable indicia 406 is located adjacent to the left side external edge 408 of the fixture 404. The entire field of view of camera system 353 in the horizontal plane is represented by angle $\alpha$. The decodable indicia 406 is within the field of view of the camera, where angle $\theta$ corresponds to the viewing angle necessary to encompass width W of decodable indicia 406. Angle $\beta$ represents the remaining portion of fixture 404 within the field of view of the camera in the horizontal plane (not including $\theta$ where the decodable indicia in located on the fixture 404). In this embodiment, the entire width of the fixture 404 (the X-direction) is within the field of view of the camera where the entire width of the fixture 404 is represented by $\theta+\beta$. In this embodiment, the field of view extends beyond the left side external edge 408 of the fixture 404 (e.g., open space equal to $\alpha-\theta-\beta$). The EIR terminal 100 may be arranged such that angle $\alpha$ views only a portion of the fixture 404 (e.g., not the entire width of fixture 404). The distance of the camera from the fixture 404 in the Z-direction is A.

FIG. 11 also schematically illustrates an EIR terminal evaluating both a horizontal and a vertical plane according to one embodiment. In this embodiment the EIR terminal 100, using camera system 353, isolates and views both a horizontal plane and a vertical plane, each including the decodable indicia 406 (e.g., see 904 and 906). In addition to the horizontal plane, the EIR terminal 100, using camera system 353, isolates and views a vertical plane including the decodable indicia 406 (e.g., see step 906). In this embodiment, the decodable indicia 406 is not located adjacent to either the upper side external edge 408 or the lower side external edge 408 of the fixture 404. The entire field of view of camera system 353 in the vertical plane is represented by angle $\omega$. The decodable indicia 406 is within the field of view of the camera where angle $\lambda$ corresponds to the viewing angle necessary to encompass height H of decodable indicia 406. In this embodiment, angle $\omega$ spans only a portion of fixture 404 (e.g., the height in the Y-direction of fixture 404 larger than angle $\omega$).

In certain aspects, the decodable indicia 406 is any item storing coded data including but not limited to: a one-dimensional bar code, a two-dimensional bar code, a QR code, an RFID tag, or any combination thereof. The decodable indicia 406 may be located on an outer surface, on an inner surface, embedded inside, or adjacent to a fixture 404.

It should be noted that fixtures can be any type of fixture to support inventory. For example, the fixture can be at least one of shelving units, linear clothing racks, non-linear clothing racks, tables with one or more surfaces, or any combination thereof.

The previously described embodiments are merely examples. For example, a plurality of the EIR terminals 100 may include wireless connections to form a wireless mesh network where the EIR terminals 100 are connected to one another and to computers and/or DBs through a cloud-based mesh network (a mesh cloud). Any changes to the EIR terminals 100 and associated hardware of the mesh network elicit automatic reconfiguration of the mesh network based on available hardware.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the disclosure. The embodiments were chosen and described in order to best explain the principles of embodiments of the invention and the practical application, and to enable others of ordinary skill in the art to understand embodiments of the invention for various embodiments with various modifications as are suited to the particular use contemplated.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain principles and practical applications of the invention, and to thereby enable others skilled in the art to best utilize the invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention. The following claims are in no way intended to limit the scope of embodiments of the invention to the specific embodiments described herein.

What is claimed is:

1. A method of determining an initial point for a scan path, the method comprising:
    acquiring, using a mobile device, an image of an object, the image comprising decodable indicia;
    decoding, using the mobile device, data from the decodable indicia;
    determining indicia dimensions of the decodable indicia based on the data comprising scanning the decodable indicia to obtain data indicating the indicia dimensions of the decodable indicia;
    determining image dimensions of the decodable indicia in the image comprising detecting one or more edges of the object within the image; and
    calculating an initial location of the mobile device relative to the decodable indicia based on a geometric relationship between the indicia dimensions of the decodable indicia and the image dimensions of the decodable indicia in the image.

2. The method according to claim 1, wherein the initial location comprises coordinates of a location indicating a beginning reading point of the mobile device.

3. The method according to claim 1, wherein the calculating an initial location of the mobile device comprises:
    determining an x distance of the mobile device from an origin using decodable indicia dimension data decoded from the decodable indicia; and
    determining a y distance of the mobile device from the origin.

4. The method according to claim 1, further comprising determining an orientation of the mobile device.

5. The method according to claim 1, further comprising determining an orientation of the mobile device based on an orientation of one of the decodable indicia in the image or the object in the image.

6. The method according to claim 1, further comprising analyzing the image for errors and correcting the errors.

7. The method according to claim 6, wherein the analyzing comprises checking for errors of the image, correcting the errors using correction factors, and storing the correction factors, wherein the errors comprise at least one of keystone effect errors of the image, rotation errors of the image, or perspective errors of the image.

8. The method according to claim 1,
    wherein the geometric relationship comprises a ratio of the indicia dimensions to the image dimensions, and
    wherein the calculating an initial location of the mobile device relative to the decodable indicia based on a geometric relationship comprises multiplying a base distance by the ratio to determine a distance of the mobile device from the decodable indicia.

9. The method according to claim 1, wherein the object comprises one of a shelving unit, a clothing rack, or a table.

10. The method according to claim 1, wherein the decodable indicia comprises one of a bar code or a radio frequency identification (RFID) tag.

11. The method according to claim 1, wherein the determining image dimensions of the decodable indicia in the image comprises measuring a number of pixels in the image comprising the decodable indicia to calculate a physical relationship between a location of the mobile device and the decodable indicia based on the indicia dimensions of the decodable indicia.

12. A method of determining an initial point for a scan path, the method comprising:
    acquiring, using a mobile device, an image of an object, the image comprising decodable indicia;
    decoding, using the mobile device, data from the decodable indicia;
    determining indicia dimensions of the decodable indicia based on the data;
    determining image dimensions of the decodable indicia in the image; and
    calculating an initial location of the mobile device relative to the decodable indicia based on a geometric relationship between the indicia dimensions of the decodable indicia and the image dimensions of the decodable indicia in the image, wherein the geometric relationship comprises a ratio of the indicia dimensions to the image dimensions, and
    wherein the calculating an initial location of the mobile device relative to the decodable indicia based on a geometric relationship comprises multiplying a base distance by the ratio to determine a distance of the mobile device from the decodable indicia.

13. The method according to claim 12, wherein
    the initial location comprises coordinates of a location indicating a beginning reading point of the mobile device.

14. The method according to claim 12, wherein
    the calculating an initial location of the mobile device comprises:
        determining an x distance of the mobile device from an origin using decodable indicia dimension data decoded from the decodable indicia; and
        determining a y distance of the mobile device from the origin.

15. The method according to claim 12, further comprising analyzing the image for errors and correcting the errors by checking for errors of the image, correcting the errors using correction factors, and storing the correction factors, wherein the errors comprise at least one of keystone effect errors of the image, rotation errors of the image, or perspective errors of the image.

16. The method according to claim 12, wherein the decodable indicia comprises one of a bar code or a radio frequency identification (RFID) tag, and wherein the object comprises one of a shelving unit, a clothing rack, or a table.

17. The method according to claim 12, wherein the determining image dimensions of the decodable indicia in the image comprises measuring a number of pixels in the image comprising the decodable indicia to calculate a physical relationship between a location of the mobile device and the decodable indicia based on the indicia dimensions of the decodable indicia.

18. The method according to claim 12, wherein the determining indicia dimensions comprises scanning the decodable indicia to obtain data indicating the indicia dimensions of the decodable indicia.

19. The method according to claim 12 wherein the determining image dimensions comprises detecting one or more edges of the object within the image.

20. A method of determining an initial point for a scan path, the method comprising:
   acquiring, using a mobile device, an image of an object, the image comprising decodable indicia;
   decoding, using the mobile device, data from the decodable indicia;
   determining indicia dimensions of the decodable indicia based on the data;
   determining image dimensions of the decodable indicia in the image; and
   calculating an initial location of the mobile device relative to the decodable indicia based on a geometric relationship between the indicia dimensions of the decodable indicia and the image dimensions of the decodable indicia in the image by:
      determining an x distance of the mobile device from an origin using decodable indicia dimension data decoded from the decodable indicia; and
      determining a y distance of the mobile device from the origin.

* * * * *